United States Patent [19]

Arai et al.

[11] Patent Number: 4,887,577
[45] Date of Patent: Dec. 19, 1989

[54] HOT-WIRE TYPE AIR FLOW METER AND AN INTERNAL COMBUSTION ENGINE WITH THE SAME

[75] Inventors: Nobukatsu Arai, Ushiku; Yoshihito Sekine, Ibaraki; Tadao Osawa, Katsuta; Hiroatsu Tokuda, Katsuta; Toshifumi Usui, Katsuta; Mitsukuni Tsutsui, Ibaraki, all of Japan

[73] Assignee: Hitachi, Ltd., Tokyo, Japan

[21] Appl. No.: 207,525

[22] Filed: Jun. 16, 1988

[30] Foreign Application Priority Data

Jun. 17, 1987 [JP] Japan .................... 62-148993

[51] Int. Cl.⁴ .............................................. F02D 5/00
[52] U.S. Cl. ........................................ 123/494; 123/478; 73/118.2
[58] Field of Search ............... 123/494, 472, 478, 480, 123/488; 73/178, 204, 861; 338/315; 364/431, 510, 588

[56] References Cited

U.S. PATENT DOCUMENTS

| 4,393,697 | 7/1983 | Sato et al. | 73/118 |
| 4,452,202 | 6/1984 | Meyer | 123/494 |
| 4,505,248 | 3/1985 | Yuzakwa et al. | 123/494 |
| 4,612,895 | 9/1986 | Kuroiwa et al. | 123/494 |

FOREIGN PATENT DOCUMENTS

| 0173946 | 3/1986 | European Pat. Off. | 123/494 |
| 023818 | of 0000 | Japan | 123/494 |
| 0135127 | of 0000 | Japan | 123/494 |
| 0185118 | of 0000 | Japan | 123/494 |

Primary Examiner—Raymond A. Nelli
Attorney, Agent, or Firm—Antonelli, Terry & Wands

[57] ABSTRACT

A compact hot-wire type air flow meter for an internal combustion engine with a high measuring accuracy is provided with a primary flow path forming an intake air passage and an auxiliary flow path incorporating therein a hot-wire element for measuring the intake air. The auxiliary flow path is defined by a flow path in an axial direction of the primary flow path and a flow path in a radial direction of the primary flow path.

11 Claims, 12 Drawing Sheets

HOT-WIRE TYPE AIR FLOW METER AND AN INTERNAL COMBUSTION ENGINE WITH THE SAME

BACKGROUND OF THE INVENTION

The present invention relates to a hot-wire type air flow meter, and more particularly to a hot-wire type air flow meter for an automotive internal combustion engine, which constitutes an intake system of the internal combustion engine, and is adapted to detect and control the flow rate of intake air.

As shown in, for example, Japanese Utility Model Unexamined Publication No. 56-135127 and Japanese Patent Unexamined Publication No. 60-185118, there has been provided a conventional passage structure for a hot-wire type air flow meter for an automotive engine, in which an auxiliary flow path is formed in an intake pipe; a hot-wire element is arranged in the auxiliary flow path; an obstacle or a complicated bent flow path that is long in the axial direction is provided downstream of the hot-wire element for the purpose of protecting the hot-wire element against a backfire or a backblow of the engine and for the purpose of preventing an abnormal output of the hot-wire element caused by the pulsation of the engine. In such a flow meter, since the auxiliary path portion including the hot-wire element is formed in such manner as to exposed to the primary flow, an output error caused by the temperature increase of the flow meter body is small. However, this arrangement requires a long physical length in the axial direction and a large number of mechanical parts which are difficult to mount. Therefore, this arrangement suffers from defects in compactness and cost.

Also, as disclosed in, for example, Japanese Patent Unexamined Publication Nos. 57-23818 and 57-113926, there has been proposed an arrangement in which a hot-wire type air flow meter and a throttle valve means are disposed close to each other in an integral body. In Japanese Patent Unexamined Publication No. 57-23818, the same techniques as those in the foregoing two publications are adopted in the arrangement in which the auxiliary passage within which the hot-wire element is disposed is defined by a straight pipe and is formed in the central portion of the primary passage. However, in the publication '818, there is no protection for the hot-wire element against backfire and backblow of the engine. The throttle valve downstream of the primary flow might serve as a protection means under the condition where it is almost closed, but the throttle valve will have no use as protection means under the full or almost full open condition thereof. Also, in addition to this problem, this arrangement suffers from another problem in which the flow within the auxiliary flow path tends to become unstable in response to the movement of the throttle valve. Japanese Patent Unexamined Publication No. 57-113926 discloses an auxiliary flow path in which a hot-wire element is disposed within a body wall having a large thermal capacity and having no wide relative transfer area, said auxiliary flow path having an L-shape formed by a first flow path parallel to a primary flow and a second flow path perpendicular to the first flow path. With such an arrangement, it is possible to protect the hot-wire element against blowback or backfire of the engine. However, due to the structure of the auxiliary flow path, since air of the primary flow cannot flow around the auxiliary flow path wall, the temperature of the auxiliary flow path wall is highly increased due to the heat generated by the hot-wire element as well as the heat transferred from the engine. As a result, the air within the auxiliary flow path is heated so that the difference in temperature between the air in the auxiliary flow path and the air in the primary flow path is large. Thus, it is impossible to exactly measure the flow rate of the intake air.

The foregoing prior art is silent with respect to the need for reduction of the pipe length between the hot-wire type air flow meter and the throttle valve means. Therefore, the prior art suffers from the problems of increase of pressure loss in the intake passage and of increase of weight and cost of the equipment. Moreover, the prior art encounters the following difficulties: (1) a heat generation of the hot-wire element; (2) a temperature increase of the auxiliary flow path wall around the hot-wire element due to thermal invasion from the outside, that is, an error due to a difference between a temperature of the actual intake air and the temperature of the air flowing through the auxiliary flow path while impinging against the hot-wire element and a temperature compensation element; (3) a countermeasure against a change of the flow rate distribution ratio between the primary flow path and the auxiliary flow path due to the swirl or change of the intake air or the change of flow downstream of the flow meter, even if the constant distribution is intended; a reduction of flow turbulence within the auxiliary flow path, that is, the reduction of the output noises; (4) a protection for the elements against the counterflow due to the backblow or backfire and the pulsation; and (5) a countermeasure against abnormal output.

SUMMARY OF THE INVENTION

Accordingly, an object of the present invention is to provide a hot-wire type air flow meter which is compact with a high measuring precision.

Another object of the present invention is to provide an internal combustion engine which is capable of controlling an air/fuel ratio in a suitable manner with use of the above-described hot-wire type air flow meter.

In order to attain these and other objects, according to the present invention, there is provided a hot-wire type air flow meter comprising a primary flow path constituting an intake air passage of an internal combustion engine, a hot-wire element for measuring an intake air, and an auxiliary flow path provided in the primary air, flow path, having therein said hot-wire element, the auxiliary flow path being defined by a flow path formed in an axial direction of the primary flow path and flow paths formed in a radial direction of the primary flow path.

According to the present invention, there is provided an internal combustion engine comprising the above-described hot-wire type air flow meter, a speed sensor for detecting an rpm of the engine, a fuel injection means for injecting fuel into an intake air, and a control means for determining a fuel injection amount based upon the rpm detected by the speed sensor and a flow rate of the intake air detected by the hot-wire type air flow meter, and for outputting a command signal for injecting the determined fuel injection amount to said fuel injection means.

According to the present invention, a hot-wire element is disposed in an auxiliary flow path independent of a primary flow path, thereby reducing an adverse effect of turbulence in the primary flow path. Also, in the auxiliary flow path having a small diameter relative to that of the primary flow path, a distance between the auxiliary flow path inlet and the hot-wire element is twice longer than the diameter of the auxiliary flow path or more, thereby performing a rather rectification of the flow to reduce the noises. Also, the auxiliary flow path downstream of the element is bent, so that the flow at the bent portion and the pressure damping effect prevent a damage of the hot-wire element due to the counter flow and reduce the adverse effect of the pulsation. According to the present invention, the distance from the inlet of the auxiliary flow path to the element is twice longer than the diameter of the auxiliary flow path or more, and the inlet of the auxiliary flow path is constructed so that it projects into the primary flow path at a constant distance from a body inner wall or a portion connecting the body inner wall and the auxiliary flow path. Furthermore, a bent auxiliary flow path having a flow path wall of the projecting portion wall has a short axial length downstream of the element and may be coupled substantially directly to a throttle valve means, to thereby solve various problems due to noises, pulsation and counter flows.

DESCRIPTION OF THE PREFERRED EMBODIMENTS

Figure 1:
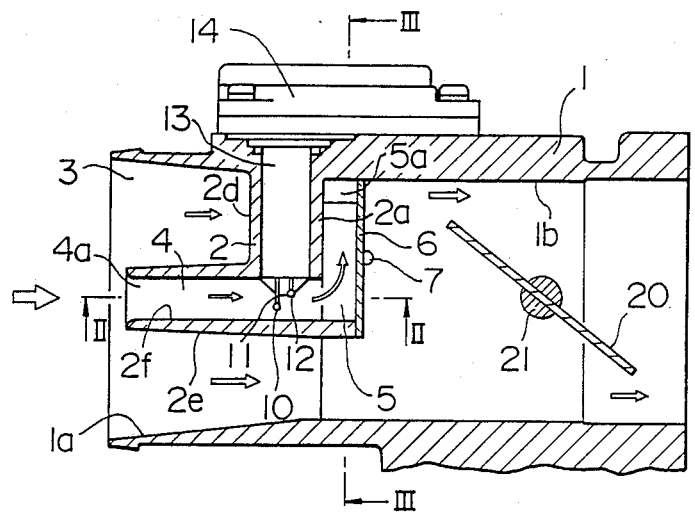
FIG. 1 is a cross-sectional view showing one embodiment of the invention.
Figure 2:
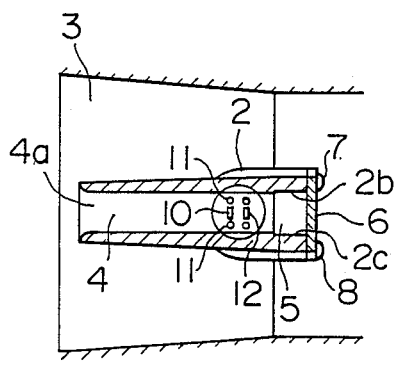
FIG. 2 is a cross-sectional view taken along the line II—II of FIG. 1.
Figure 3:
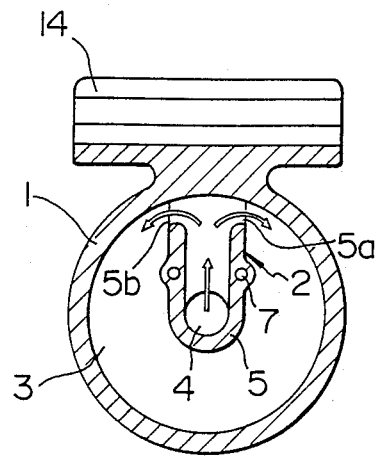
FIG. 3 is a cross-sectional view taken along the line III—III.

One embodiment of the present invention will now be described with reference to FIGS. 1, 2 and 3. A body 1 constitutes an intake passage of an internal combustion engine. Intake air is introduced from the left side in FIG. 1. The internal combustion engine is connected on the downstream side of the flow.

The body 1 forms a substantially cylindrical primary flow path 3. A projecting portion 2 that is formed integrally with the body 1 is disposed in the primary flow path 3. At a tip end of the projecting portion 2, there is provided an auxiliary flow path 4 that is parallel to the primary flow path 3 and has an inlet opening at the central portion of the primary flow path 3. Also, a hole in communication with the outside of the body 1 is formed in the projecting portion 2. In that hole, there is received a mold unit 13 of a support member 11 for a hot-wire element 10 connected to a circuit unit 14. As a result, the hot-wire element 10 and a temperature compensation element 12 are disposed in the auxiliary flow path 4. Downstream of the auxiliary flow path 4, a bent auxiliary flow path 5 having a short axial length is formed by walls 2a, 2b and 2c of the projecting portion 2 and a cover 6. A throttle valve 20 for controlling a whole air flow rate is disposed at the downstream side of the bent auxiliary flow path 5. The throttle valve 20 is opened/closed by a valve drive shaft 21. A link mechanism (not shown) connected to the shaft 21 is provided outside the body 1. The link mechnism is normally driven by a cable connected to an accelerator pedal of the vehicle. Incidentally, the cover 6 is mounted at a rear end of the projecting portion 2 by bolts 7 and 8 prior to the mounting of the throttle valve 20 and the valve drive shaft 21.

An opening portion 4a of the auxiliary flow path 4 is mounted so that it is separated by a distance that is twice as long as the inner diameter of the auxiliary flow path 4 or more, from an inner wall 1a of the body 1 and from a wall 2d of a connecting portion between the projecting portion 2 and the body 1. Also, the opening portion 4a is in the form of a bellmouth.

An inner wall 1a of the body 1 and an outer wall 2e or the like, forming the auxiliary flow path 4 of the projecting portion 2 are configured so that the flow path is expended toward the upstream side. On the other hand, an inner wall 1b of the body 1 at which the throttle valve 20 is provided is finished by machining in such manner is to have the same diameter as other's. Before the machining work, the wall 1b is in the form of a cone converging toward the leftside of FIG. 1. With such technique, the flow path may be cast-molded by using removable core molds having a division plane in the vicinity of the projecting portion wall 2a. The core molds may be removed in the right and left directions.

The blank arrows indicate the flow of air. Although almost of the air entering from the left hand in FIG. 1 will flow through the primary flow path 3, a part of the air will be introduced into the auxiliary flow path 4. Since the inlet 4a of the auxiliary flow path is sufficiently separated from the walls 1a and 2d, the flow having a relatively low turbulence is introduced into the auxiliary flow path 4.

Also, the bellmouth of the inlet 4a of the auxiliary flow path 4a may entrain a large amount of air to thereby increase the air flow speed in the vicinity of the inner wall 2f of the auxiliary flow path 4. However, the friction effect of the inner wall 2f of the auxiliary flow path 4 up to the hot-wire element causes the flow within the auxiliary flow path 4 to be sufficiently rectified so that the flow immediately before the hot-wire element 10 has a uniform flow speed distribution.

A ratio of an inlet diameter of the bellmouth to the diameter of the auxiliary flow path 4 is in the range of 1.6 to 1.2. Correspondingly, a ratio of the distance from the inlet to the hot-wire element 10 to the diameter of the auxiliary flow path 4 is in the range from about 4 to 2. However, this relation is changed in accordance with actual dimensions of the diameter of the auxiliary flow path 4 but is not a so-called one-to-one relation.

In the downstream of the hot-wire element 10, the flow is curved upwardly to be introduced into the bent auxiliary flow path 5, and subsequently is impinged against the inner wall of the body to flow out to the right and left through the outlets 5a and 5b to be immerged into the main flow. Such a flow path arrangement has an effect to damp the counter flow from the engine and to prevent the propagation of the pulsation to the vicinity of the hot-wire element 10.

According to the foregoing embodiment, with a short axial dimension, it is possible to provide a hot-wire type air flow meter for an internal combustion engine, which is free from various problems such that noises are made due to the turbulence of flow, unstable outputs are generated due to the affect of the pulsation, and the hot-wire element is damaged due to the backblow of the engine. Namely, the advantages of the compactness, the lightweight and the low cost may be enjoyed. The flow meter body and the throttle valve unit body that cannot be formed integrally in the prior art may be formed in a single integral body unit. Since the length of the intake passage is reduced, the arrangement is available in reduction in unduly pressure loss, lightweight and low cost.

Figure 4:
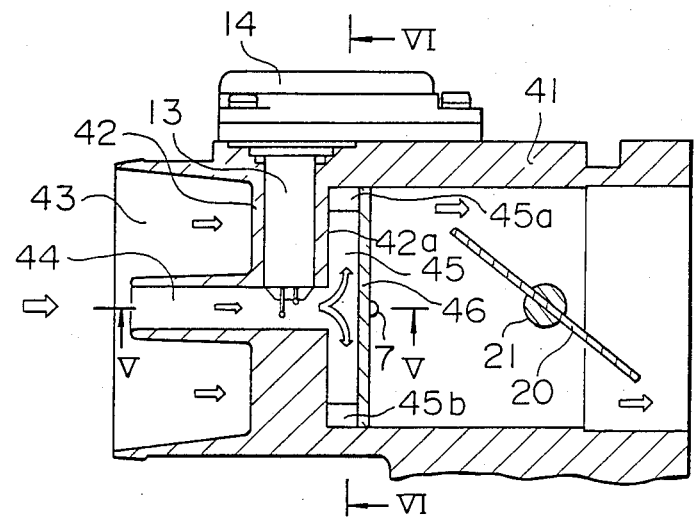
FIG. 4 is a cross-sectional view showing another embodiment of the invention.
Figure 5:
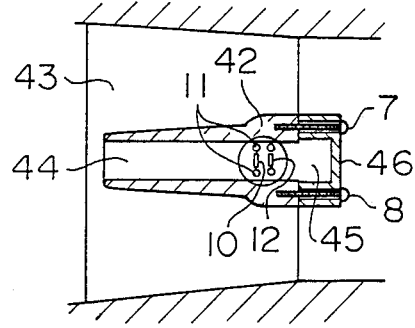
FIG. 5 is a cross-sectional view taken along the line V—V of FIG. 4.
Figure 6:
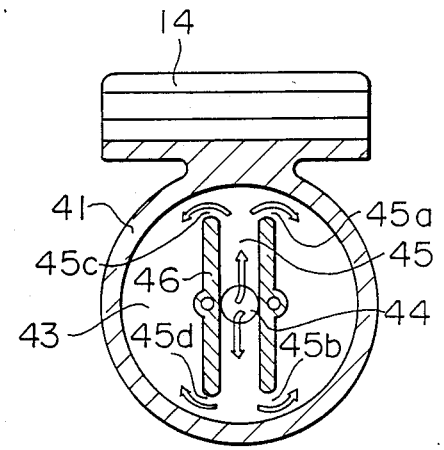
FIG. 6 is a cross-sectional view taken along the line VI—VI of FIG. 4.

FIGS. 4 to 6 show a second embodiment of the invention. The difference over the first embodiment shown in FIGS. 1 to 3 will be explained. A projecting portion 42 is formed integrally with the upper and lower walls of a body 41 (or is integral with the right and left walls of the body, i.e., in the axial direction of the throttle valve drive shaft 21, if desired). With such an arrangement, it is possible to form bent auxiliary flow paths 45 downstream of the auxiliary flow path 44 in the up and down directions. Also, the outlet surface of the auxiliary flow path 44, i.e., a rear end face 42a of the projecting portion 42 is made in a flat surface. This makes it easy to perform a machining work because of the reduction of the surface roughness. Also, an auxiliary flow path cover 46 is formed in U-shape in cross section unlike the simple planar plate as in the first embodiment. The cover 46 is also mounted on the rear end face of the projecting portion 42 by means of bolts 7 and 8. Since the auxiliary flow path 46 is made of a member separated from the body, it is possible to finish the rear end face 42a of the projecting portion 42. Therefore, it is possible to reduce the surface roughness of the inner surface of the bent auxiliary flow paths 45 as a whole. Also, it is possible to obtain a good sealing effect on the connecting portions. This is effective to avoid the case where the performance of the hot wire element 10 is unstable due to the unstability of the flow within the bent auxiliary flow paths and the insufficiency of the pressure seal against the primary flow path.

It is apparent that, in the first embodiment, the same effect as in the second embodiment may be ensured by making the rear end face of the projecting portion 2 flat and using the U-shaped cover instead of the planar cover 6.

The effect of the second embodiment in which the bent auxiliary flow paths 45 are provided in the up and down direction is the interference effect in front of the auxiliary flow path 44 in the case where the pulsation is produced. Namely, the second embodiment is more available against the pulsation. However, in the second embodiment, since the flow path resistance is decreased, it is desired that some modification such as reduction of the area of the outlets 45a to 45d be made in conformity with the engine.

There is no difference in structural effect between the first and second embodiments.

Figure 7:
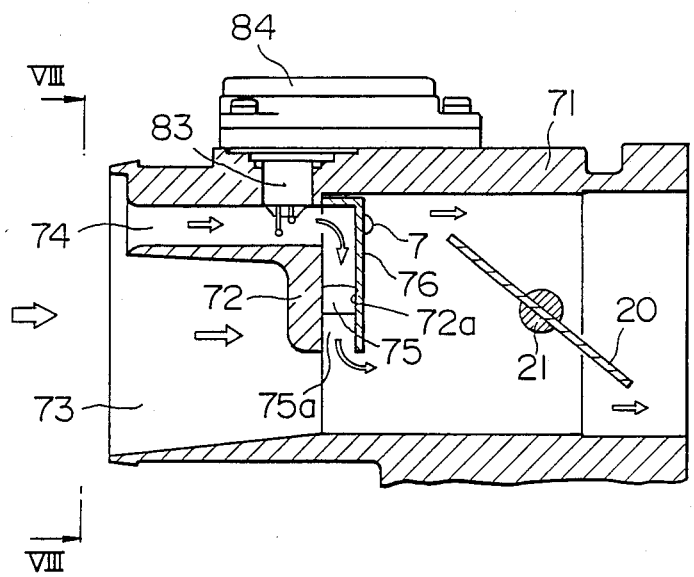
FIG. 7 is a cross-sectional view showing another embodiment of the invention.
Figure 8:
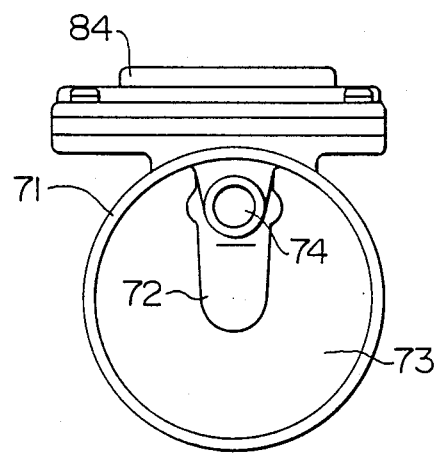
FIG. 8 is a cross-sectional view taken along the line VIII—VIII of FIG. 7.

FIGS. 7 and 8 show a third embodiment of the invention. An auxiliary flow path 74 in parallel to a primary flow path 73 is provided at a portion near to the inner wall of the body 71 rather than the tip end of the projecting portion 72 from the body 71. The bent auxiliary flow path 75 downstream of the auxiliary flow path 74 is defined by a rear end wall 72a of the projecting portion 72 and an auxiliary flow path cover 76 mounted on the wall 72a by a bolt 7. The rear end portion of the projecting portion 72 extends close to the central portion of the primary flow path 73. Therefore, the flow within the bent auxiliary flow path 75 is first directed from the inner circumferential wall of the body 71 along the wall 72a toward the central portion of the primary flow path 73. Then, the air is made to flow from the bent auxiliary flow path outlet 75a toward the right and left and downwardly. Downstream of the bent path 75, the throttle valve 20 and the drive shaft 21 are disposed within the integral body in the same manner as in the first and second embodiments.

According to the features of the third embodiment, it is possible to reduce a length of a molded portion 83 integral with the circuit unit 84, which is available in cost. Also, since the projecting portion 72 may be relatively short, it is possible to reduce the flow resistance of the primary flow path 73. Also, since the mass corresponding to the overhang portion is small, the structure is advantageous against the vibration in comparison with the first embodiment. However, the turbulence in the flow entering into the auxiliary flow path 74 is somewhat larger. Therefore, it is desired that, for that reason, the diameter of the bellmouth be enlarged and the distance to the hot-wire element 10 of the auxiliary flow path 74 be elongated.

The basic effect of the third embodiment is substantially the same as that of the first embodiment.

Figure 9:
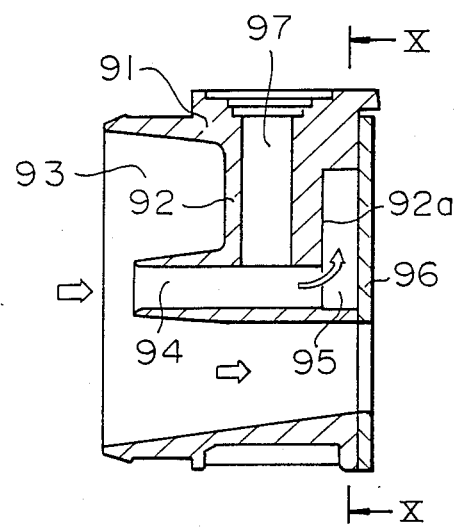
FIG. 9 is a cross-sectional view showing another embodiment of the invention.
Figure 10:
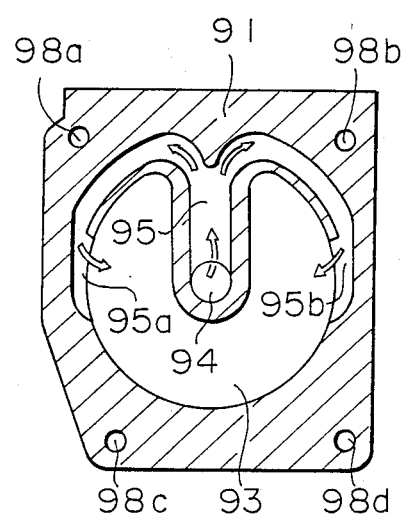
FIG. 10 is a cross-sectional view taken along the line X—X of FIG. 9.

FIGS. 9 and 10 shows a fourth embodiment of the invention.

Unlike the first through third embodiments, a body 91 is made of a single unit of a hot-wire type flow meter. A projecting portion 92 is formed substantially in the same manner as the first embodiment. An auxiliary flow path 94 is formed at an end of the projecting portion 92. A part of the bent auxiliary flow path 95 is formed along a rear end face 92a of the projecting portion 92. The rest of the bent auxiliary flow path 95 is formed so as to project outside the primary flow path 93 and to enter the body 91 to be branched into the right and left sides from the upper side in the range of about 90 degrees as shown in FIG. 10. Therefore, the outlets of the bent auxiliary flow path 95 are located on both sides as shown in FIG. 10. The flow path surface of the portion downstream of the bent auxiliary flow path 95 is formed by a gasket 96. Namely, a body of the throttle valve unit independent of the flow meter body 91 is coupled through the gasket to the flow meter body with bolt holes 98a to 98d.

Since the bent auxiliary flow path 95 may be elongated, the fourth embodiment may be applied to an engine which suffers from a large pulsation.

Figure 11:
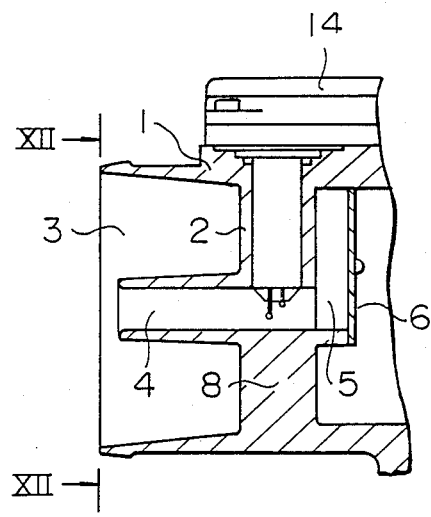
FIG. 11 is a cross-sectional view showing another embodiment of the invention.
Figure 12:
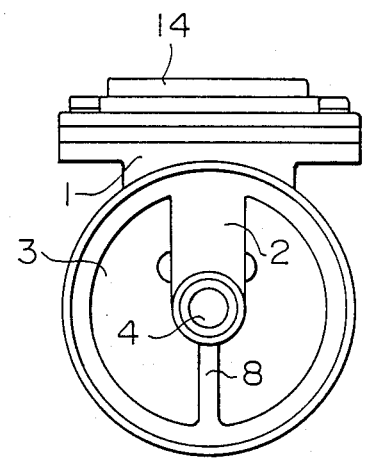
FIG. 12 is a cross-sectional view taken along the line XII—XII of FIG. 11.

FIGS. 11 and 12 show a fifth embodiment of the invention, in which a reinforcement rib 8 is added to the structure shown in the first embodiment. More specifically, there are provided a part for forming the auxiliary flow path 4 at the tip end of the projecting portion 2 of the first embodiment and a rib 8 connected to an opposite inner wall of the body 1. With such an arrangement, it is possible to increase a strength for an earthquake-proof and reduce a deformation of the projecting portion 2 during the cast molding. The other effects are the same as those of the first embodiment.

Figure 13:
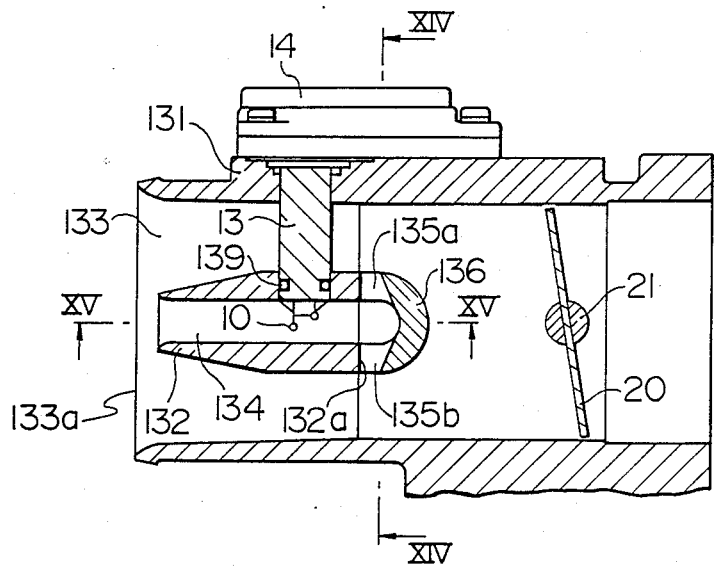
FIG. 13 is a cross-sectional view showing another embodiment of the invention.
Figure 14:
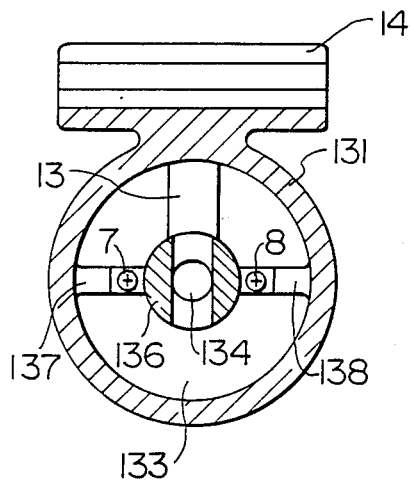
FIG. 14 is a cross-sectional view taken along the line XIV—XIV of FIG. 13.
Figure 15:
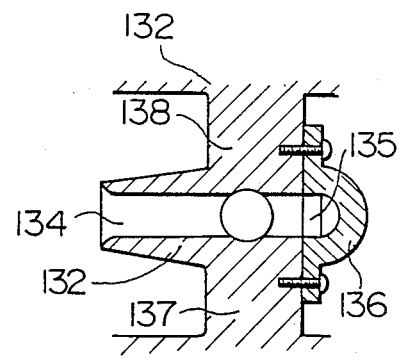
FIG. 15 is a cross-sectional view taken along the line XV—XV of FIG. 13.

FIGS. 13 to 15 show a sixth embodiment of the invention. A projecting portion 132 from the body 131 is formed by ribs 137 and 138 formed in a direction perpendicular to the mold portion 13 connected to the circuit unit 14 and a cylindrical portion 132 defining the auxiliary flow path 134. Therefore, the molded portion 13 of the circuit unit 14 is passed through a wall of the body 131 and once crosses the primary flow path 133 to penetrate a hole of the projecting portion 132, so that the hot element 10 is disposed within the auxiliary flow path 134. An O-ring 139 is disposed at a portion of the molded portion 13 inserted into the hole of the projecting portion 132. The O-ring 139 serves to impart the seal effect between the primary flow path 133 and the auxiliary flow path 134. A bent auxiliary flow path 135 is defined by a rear end face of the projecting portion 132 and a cover 136. Two outlets 135a and 135b are formed in the up and down direction of the cover 136. The outlets 135a and 136b are formed so that the flow therethrough is rather returned back to the upstream side. This is because the length of the bent auxiliary flow path is short and the orientation of the outlets may compensate for this shortage.

The advantage of this embodiment is that, since the projecting portions 137, 138 and 132 are located in the direction of the throttle valve drive shaft 21 that is inherently an obstacle or block against the primary flow path 133, it is possible to reduce the substantial flow resistance within the primary flow path 133. Also, in this embodiment, the inlet portion 133a of the primary flow path 133 is in the form of a bellmouth to thereby impart the rectifying effect.

The various embodiments of the invention have been described but it is apparent that in any of the embodiments, the cover member of the bent auxiliary flow path is not necessarily mounted by bolts. Any other mounting means such as bonding or adhesive may be used and it is possible to seal the contact portion of the projecting portion rear face and the cover with seal material.

Figure 16:
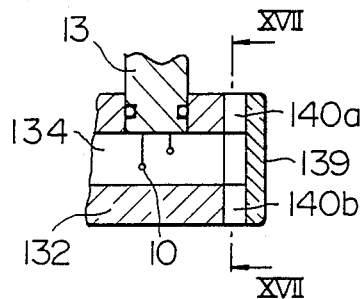
FIG. 16 is a cross-sectional view showing a part of an auxiliary flow path according to an embodiment of the invention.
Figure 17:
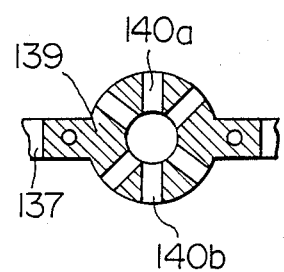
FIG. 17 is a cross-sectional view taken along the line XVII—XVII of FIG. 16.

FIGS. 16 and 17 show a seventh embodiment of the invention which is substantially the same structure as that of the sixth embodiment. However, in the seventh embodiment, flow paths 140a, 140b or the like perpendicular to the primary flow are formed in the cover 139. According to this embodiment, since a flow path cross section of each of the flow path 140a, 140b may be reduced, it is possible to further reduce the axial length.

Figure 18:
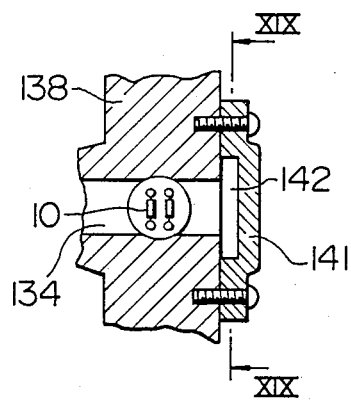
FIG. 18 is a cross-sectional view showing a part of an auxiliary flow path according to another embodiment of the invention.
Figure 19:
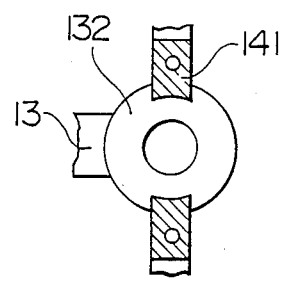
FIG. 19 is a cross-sectional view taken along the line XIX—XIX of FIG. 18.

FIGS. 18 and 19 show an eighth embodiment of the invention which is substantially the same structure as that of the sixth embodiment. However, in the eighth embodiment, the flow path 142 perpendicular to the primary flow is in the form of a disc, that is, if the bypass flow path 134 is included, the flow path 142 is in the form of a mushroom. According to the present embodiment, it is possible to reduce the axial length in comparison with the seventh embodiment.

Figure 20:
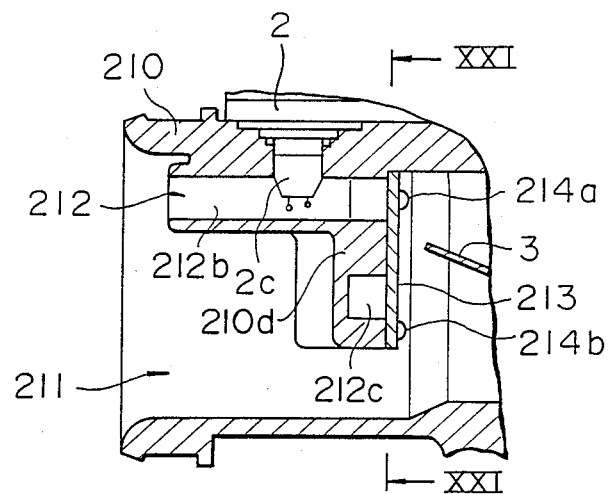
FIG. 20 is a cross-sectional view showing another embodiment of the invention.
Figure 21:
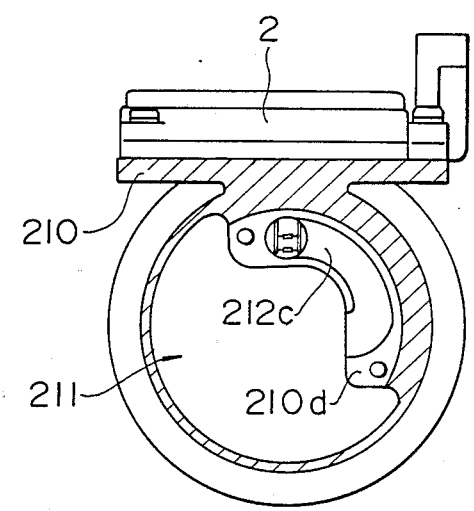
FIG. 21 is a cross-sectional view taken along the line XXI—XXI of FIG. 20.

FIGS. 20 and 21 show a ninth embodiment of the invention. The projection portion 210d, provided with the auxiliary flow path 212, which is integral with the body 210 and projected into the primary flow path 211 is formed through about 90 degrees along the inner wall of the body. Therefore, the auxiliary flow path 212c perpendicular to the auxiliary flow path 212b in parallel with the primary flow path 211 is oriented in the radial direction and in the circumferential direction to form a semicircular shape. The fluid resistance of the auxiliary flow path 212c is composed of a passage configuration resistance and a frictional resistance of an elbow passage having a square cross section of small curvature of about 90 degrees and a substantially right angled bend. By selecting the passage cross sectional area of the auxiliary flow path 212c, it is possible to increase the fluid resistance of this part in comparison with the foregoing embodiment. The downstream wall of the auxiliary flow path 212c against the primary flow is formed by the planar cover 213 which is fixed to the projecting wall 210d by means of bolts 214a and 214b. In this embodiment, in the case where an injector is to be disposed before the throttle valve 3 due to some causes, for example, the application of a single point injection system, the above-described arrangement is necessary. In this case, for instance, it may be the case that the throttle valve shaft is arranged at an angle of 45 degrees with respect to the direction in which the molded portion 2c for holding the hot-wire element is oriented. This is available to reduce the pressure loss as a whole at a high flow rate. The other effects of the ninth embodiment are the same as those of the first through third embodiments.

Figure 22:
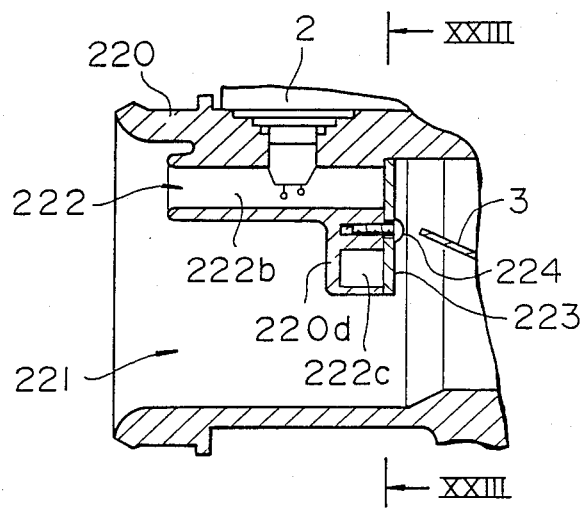
FIG. 22 is a cross-sectional view showing another embodiment of the invention.
Figure 23:
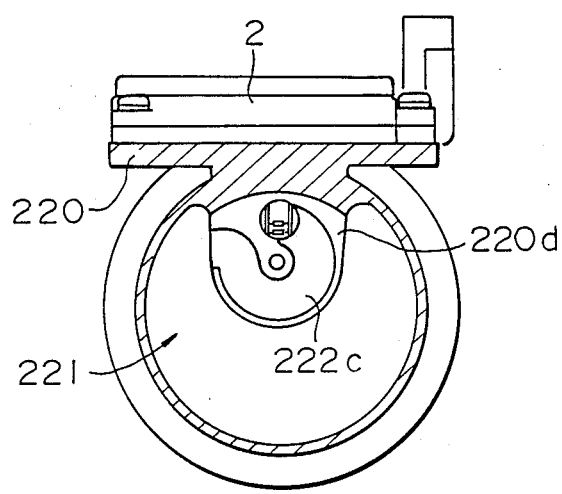
FIG. 23 is a cross-sectional view taken along the line XXIII—XXIII of FIG. 22.

FIGS. 22 and 23 show a tenth embodiment of the present invention. In this embodiment, it is intended that the auxiliary flow path having a relatively large fluid resistance is formed in the projecting portion having a relatively small volume. More specifically, a flow path 222c perpendicular to the auxiliary flow path 222b in which the hot-wire element is disposed is formed in a doughnat-shape. With such an arrangement, the projecting portion 220d of the body 220 projecting into the primary flow path 221 is small in comparison with the flow passage length of the auxiliary flow path 222c. The wall of the auxiliary flow path 222c on the downstream side against the primary flow is formed by a planar cover 223 fixed to the projecting portion 220 by a bolt 224 or the like. The flow resistance of the auxiliary flow path 222c is composed of a passage configuration resistance of an elbow having a square cross section with a relatively high curvature of about 270 degrees and a substantially right-angled bend, and a frictional resistance of the somewhat longer passage length. Except for the case that the cross section of the auxiliary flow path 222c is extremely increased, it is possible to increase the fluid resistance, i.e., the equivalent length of the passage in comparison with the foregoing embodiments. Thus, the arrangement of the tenth embodiment is available for an internal combustion engine in which a backblow is large, a backfire is likely to be generated or an intake pulsation is large. The other effects of the tenth embodiment are the same as those of the first through third embodiments.

Figure 24:
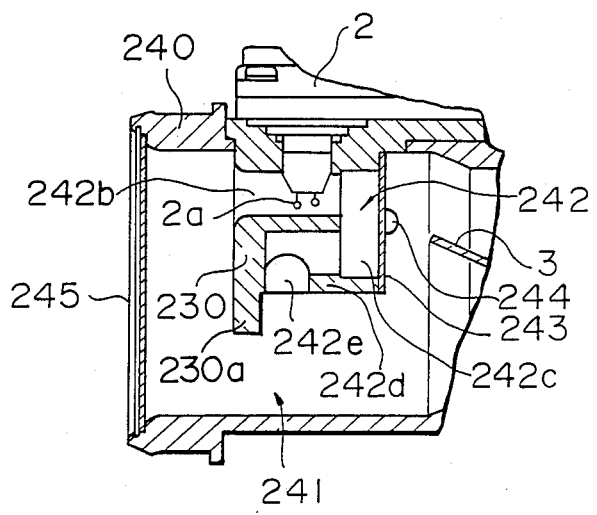
FIGS. 24, 25, 26 and 27 are cross-sectional views showing other embodiments of the invention.

FIG. 24 shows an eleventh embodiment of the invention which realizes the auxiliary flow path having a relatively large fluid resistance with a structure in which the axial dimension is not increased. In a probe holder block 230 which is a separate member from a body 240 and is coupled to a circuit unit 2, the entire auxiliary flow path 242 is formed of an auxiliary flow path 242b in parallel with the primary flow path 241, an auxiliary flow path 242c having a square cross section and directed perpendicular to the flow path 242b, an auxiliary flow path 242d directed to the upstream side against the primary flow, perpendicular to the auxiliary flow path 242c, and an auxiliary flow path 242e directed in the radial direction, perpendicular to the auxiliary flow path 242d. The downstream wall of the auxiliary flow path 242c relative to the primary flow is formed by a planar cover 243 which is fixed to the holder block 230 by means of a bolt 244. In this embodiment, since the length of the auxiliary flow path 242b upstream of the hot-wire element 2a is short due to its structure, a mesh member 245 is provided at an inlet opening of the body 240. Also, the upstream wall of the holder block 230 relative to the primary flow is extended further into the primary flow relative to the outlet of the auxiliary flow path 242e so that the primary flow is prevented from inpinging directly to the outlet of the auxiliary flow path 242e, thus stabilizing the static pressure thereat and the flow within the auxiliary flow path to reduce the noises.

In this embodiment, the fluid resistance of the auxiliary flow path 242 is composed of a frictional resistance in proportion to the long passage length and a passage configuration resistance element composed of three right-angled bends. The equivalent length of the passage the eleventh embodiment is longer than that of the tenth embodiment. In other words, the effect of this embodiment is strong against the backblow, backfire and intake pulsation as in the tenth embodiment. Also, if the fluid resistance of the auxiliary flow path, and in particular, the configuration resistance are increased, it is possible to decrease the flow rate distribution ratio of the auxiliary flow path to the primary flow path at a high flow rate (high speed region). This makes it possible to reduce the flow rate in the vicinity of the hot-wire element and is available against the contamination due to adhesion of dust or foreign matters.

In this embodiment, in view of the working formation of the auxiliary flow path 242, the auxiliary flow path 242 is separately formed from the body 240 and detachably mounted to the body 240. However, it is apparent that, if the formation of the auxiliary flow paths 242c and 242e is carried out by boring from the outside of the body, it is possible to form the auxiliary flow path integrally with the body.

Figure 25:
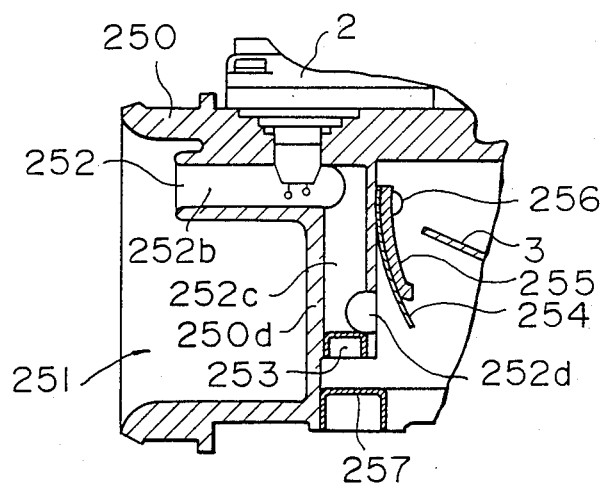

FIG. 25 shows a twelfth embodiment of the invention, in which an auxiliary flow path 252b in parallel to the primary flow path 251 an an auxiliary flow path 252c perpendicular to the auxiliary flow path 252b are formed in a projecting portion 250d of the body 250, and further an outlet opening 252d of the auxiliary flow path is formed so as to be directed in the downstream direction of the primary flow with a check valve 254. Since the outlet opening 252d is perpendicular to the primary flow, if the counter flow due to the backblow or backfire is produced, without any modification, the counter flow within the auxiliary flow path is remarkable in comparison with the foregoing embodiments in which the oullet surface of the auxiliary flow path is in parallel with the primary flow. This is avoided by the check valve 254. The check valve 254 made of thin plate material is supported by a retainer 255 that is short in length than the check valve 254 and fixed thereto by a bolt 256. Also, in order to largely hinder the flow from the auxiliary flow path outlet 252, the check valve 254 is constructed so that it is normally opened toward the retainer 255 as shown in FIG. 25. When the counter flow is generated, the dynamic pressure is applied to the check valve 255 to thereby clog the auxiliary flow path 252d to prevent the counter flow from entering into the auxiliary flow path 252.

The fluid resistance of the auxiliary flow path 252 of this embodiment is composed of a passage configuration resistance of the two right-angled bends and a passage frictional resistance and is smaller than that of the eleventh embodiment. However, because of the provision of the check valve, this embodiment is available against the backblow or backfire. The embodiment is advantageous against the contamination due to a long service life as described in conjunction with the eleventh embodiment. Incidentally, the auxiliary flow path 252c of this embodiment is formed in a circular cross section from the outside of the body 250. Blind plugs 253 and 257 are provided for the respective flow path formations.

Figure 26:
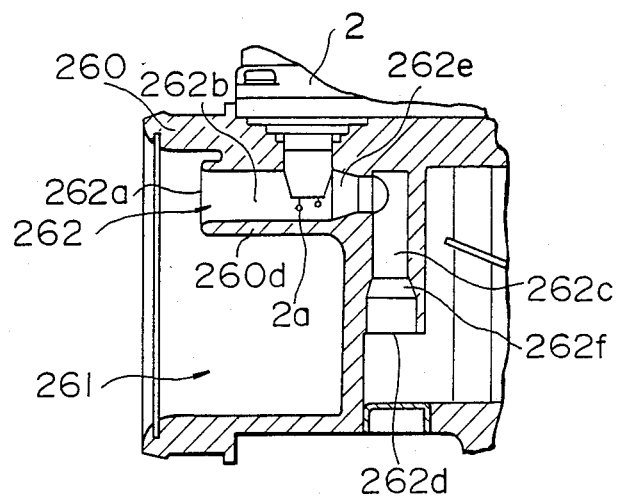

FIG. 26 shows a thirteenth embodiment of the invention. According to this embodiment, it is possible to attain a simple structure which increase the fluid resistance of the auxiliary flow path as in the tenth to twelfth embodiments, that is, which is suitable for an internal combustion engine in which suffers from a large backblow or backfire or for an internal combustion engine which generates a large intake pulsation, and which is advantageous against the foreign matter adhesion for a long time. A throttle 262e is provided downstream of a hot-wire element 2a of an auxiliary flow path 262b in parallel to a primary flow, formed in a projecting portion 260d of a body 260, thereby reducing a cross sectional area (diameter) of the auxiliary flow path 262c perpendicular to the primary flow relative to the auxiliary flow path 262b parallel to the primary flow. Also, an enlarged portion 262f is provided before an outlet 262d of the auxiliary flow path 262c, so that an area of the outlet 262d is equal to that of the inlet 262a of the auxiliary flow path 262b.

By providing the throttle 262e and reducing the diameter of the flow path 262c to thereby add the passage configuration resistance of reduction and enlargement, it is possible to increase the fluid resistance of the auxiliary flow path downstream of the hot-wire element 2a, in particular, the fluid resistance against the counter flow. Accordingly, it is possible to attain the foregoing effects. Also, the area of the outlet 262d is increased and the cross sectional area of the flow path 260d is set to the relatively large level, so that it is possible to reduce the static pressure loss due to the dynamic pressure change from the inlet to the outlet and it is possible to reduce the passage friction resistance of the flow path 260d. Thus, the flow rate distribution ratio in the low flow rate region may be relatively increased.

Figure 27:
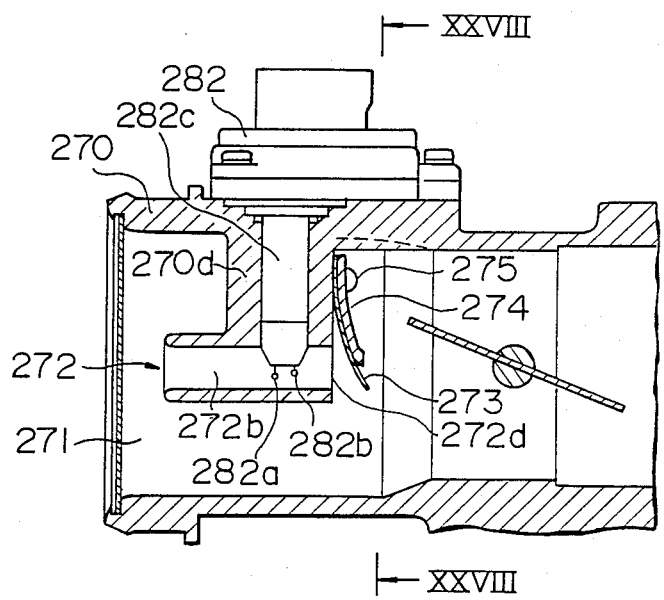
Figure 28:
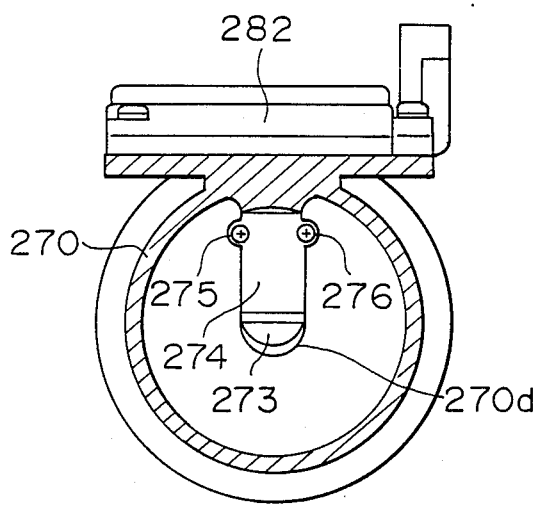
FIG. 28 is a cross-sectional view taken along the line XXVIII—XXVIII of FIG. 27.
Figure 29:
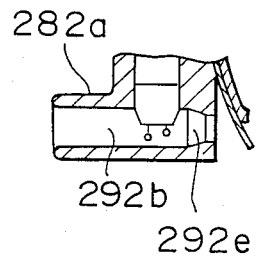
FIG. 29 shows a modification of a part shown in FIG. 27.

FIGS. 27 to 29 show still another embodiment of the present invention to attain the objects of the invention.

As auxiliary flow path 272 opened to a central portion of a primary flow path 271 of a projecting portion 270d of a body 270 is defined only by an auxiliary flow path 272b parallel to the primary flow. The surface of the projecting portion 270d on the downstream side relative to the primary flow is made flat. On this surface, there is provided a check valve 273 for closing the outlet 272d of the auxiliary flow path when the dynamic pressure of the counter flow is applied to that surface. The check valve 273 is backed up by a retainer 274 that has a shorter length than that of the check valve 273. The retainer 274 is fixed to the outlet portion 270d by means of bolts 275 and 276. A circuit unit 282 has a long molded portion 272c. A hot-wire element 282a and a temperature compensation element 282b are disposed in the auxiliary flow path 272b.

Owing to the above-described effect of the check valve, according to this embodiment, it is possible to realize a hot-wire type flow meter for an internal combustion engine, with a short axial dimension, in which the temperature characteristics are excellent. The flow meter is resistive against the backblow or backfire of the engine. However, in this arrangement, since the auxiliary flow path 272 has a short passage length, there are problems such that the reduction effect of the pulsation is small and the flow rate reduction effect in the high flow rate region is not attained.

FIG. 29 shows a partial modification of the embodiment shown in FIG. 27. In this modification, in the auxiliary flow path 292b, a throttle 292e is provided downstream of the hot-wire element 282a whereby it is possible to reduce the flow rate within the auxiliary flow path 292b in the high flow rate region and to somewhat damp the pulsation.

Figure 30:
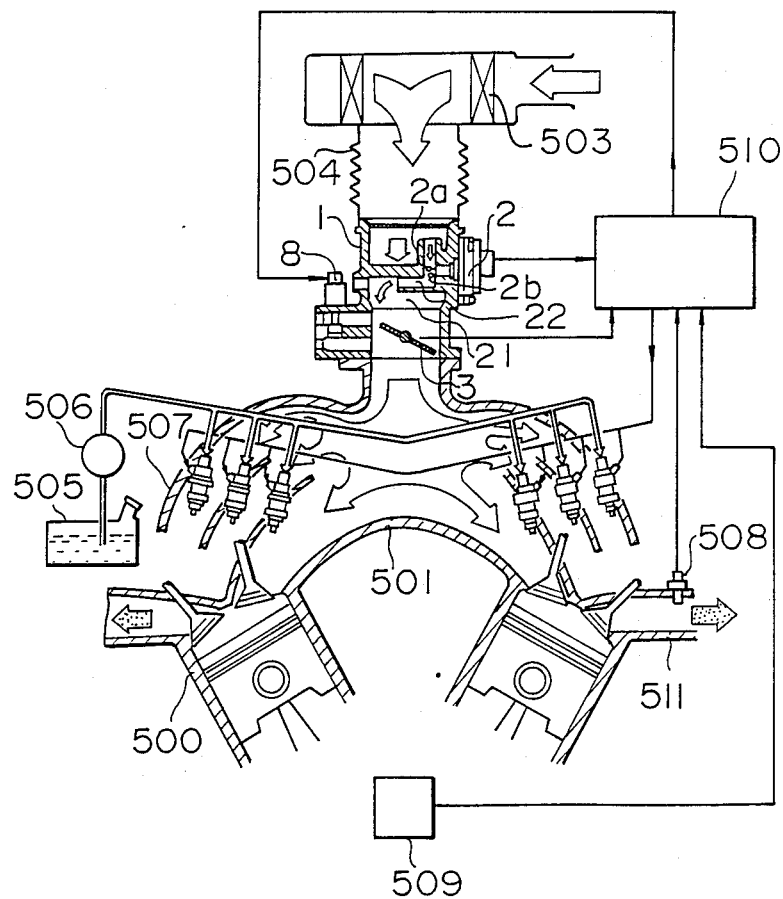
FIG. 30 is a view showing a system of an electronic fuel injection means according to the present invention.

The internal combustion engine to which the invention pertains will be described with reference to FIG. 30. FIG. 30 shows a system of the internal combustion engine provided with an electronic control type fuel injection unit to which the automotive hot-wire type air flow meter according to the invention is applied.

Air for cylinders 500 is sucked through an air filter 503 and is made to flow through a connector pipe 504, a flow meter 1 and an intake manifold 501. The flow meter 1 is provided with an auxiliary flow path 22 projected into a primary flow path 21. A hot-wire element 2a and a temperature compensation element 2b that is in unison with a circuit unit 2 are provided within the auxiliary flow path 22, thereby detecting the flow rate of air through this portion to obtain an output relative to the overall intake air flow rate. A throttle valve 3 for controlling the intake air flow rate, that is associated with an acceleration pedal of a vehicle is provided in the passage of the flow meter 1. Furthermore, an idle speed control (ISC) valve 8 for controlling a flow rate at the throttle valve fully closed condition (idle speed) is disposed in the flow meter 1.

On the other hand, fuel is injected into the intake manifold 501 from an injector 507 by an injection pump 506 coupled to a fuel reservoir 505 and is supplied to the engine 500 together with the air.

Into a control unit 510, there are inputted an output signal of the hot-wire element circuit unit 2, a rotational angle signal of the throttle valve 3, an output signal of an oxygen concentration sensor 508 provided in an exhaust manifold 511, an output signal of an engine rpm sensor 509 and the like. Thus, a fuel injection amount and the ISC valve opening degree are calculated. In response to the calculation results, the injector 507, the ISC valve 8 and the like are controlled. Also, a data table of the fuel injection amounts corresponding to the intake air flow rate and the rpm is stored in the control unit 510, so as to immediately determine the intake air flow rate on the basis of the hot-wire element and the fuel injection amount on the basis of the rpm from the rpm sensor, thus controlling the fuel injection amount to be injected from the injection unit.

We claim:

1. A hot-wire type air flow meter comprising a primary flow path constituting an intake air passage of an internal combustion engine, a hot-wire element for measuring intake air, and an auxiliary flow path provided substantially entirely within said primary flow path and having mounted therein said hot-wire element, said auxiliary flow path having an L-shaped configuration including a flow path portion formed in an axial direction of said primary flow path and a flow path portion formed in a radially inward direction of said primary flow path and extending at least half way across said primary flow path, and wherein said auxiliary flow path portion in the axial direction of said primary flow path is provided eccentrically with respect to said primary flow path.

2. A flow meter according to claim 1, wherein said hot-wire element is provided in the flow path portion formed in the axial direction of said primary flow path.

3. The flow meter according to claim 1, wherein a throttle for throttling air flow is provided at an inlet portion of said auxiliary flow path.

4. The flow meter according to claim 1, wherein a member for forming said primary flow path is integral with a member for forming said auxiliary flow path.

5. The flow meter according to claim 1, wherein the auxiliary flow path portion formed in the radial direction of said primary flow path comprises a plurality of outlet openings at the end thereof opposite said auxiliary flow path portion formed in the axial direction.

6. A hot-wire type air flow meter according to claim 1, said auxiliary flow path portion defined in an axial direction of said primary flow path having a check valve for preventing a counter flow back to said auxiliary flow path, said check valve being located in an outlet portion of said auxiliary flow path.

7. An internal combustion engine comprising the hot-wire air flow meter; an rpm sensor for sensing an rpm of the internal combustion engine; a fuel injection means for injecting fuel into the sucked air; and a controlling means for determining the corresponding fuel injection amount on the basis of the sucked air flow rate detected by said hot wire type air flow sensor and the rpm detected by said rpm sensor, and for outputting a command signal for the determined fuel injection amount to said fuel injection means, wherein said hot-wire type air flow meter comprises a primary flow path constituting an intake air passage of an internal combustion engine, a hot-wire element for measuring intake air, and an auxiliary flow path provided substantially entirely within said primary flow path and having mounted therein said hot-wire element, said auxiliary flow path having an L-shaped configuration including a flow path portion formed in an axial direction of said primary flow path and a flow path portion formed in a radially inward direction of said primary flow path and extending at least half way across said primary flow path, and wherein said auxiliary flow path portion in the axial direction of said primary flow path is provided eccentrically with respect to said primary flow path.

8. A hot-wire type air flow meter comprising a hollow body forming a primary flow path constituting an intake air passage of an internal combustion engine; a hot wire element for measuring intake air; and an auxiliary flow path formed in a radial arm disposed in said primary flow path within said hollow body and having said hot-wire element mounted therein; said radial arm having a bore extending therethrough in the direction of said primary flow path, a groove in the downstream surface thereof and communicating with said bore, and a cover plate secured over said groove to form said groove into a channel having an opening into said primary flow path serving as an outlet for said auxiliary flow path.

9. A hot-wire type air flow meter as claimed in claim 8, wherein said bore communicates with said groove intermediate the ends of said groove and said cover plate covers said groove so as to provide a pair of outlets for said auxiliary flow path at opposite ends of said groove.

10. A hot-wire type air flow meter as claimed in claim 8, wherein said radial arm extends completely across said primary flow path within said hollow body.

11. A hot-wire type air flow meter comprising a hollow body forming a primary flow path constituting an intake air passage of an internal combustion engine; a hot wire element for measuring intake air; and an auxiliary flow path formed in a circumferential projection extending into said primary flow path within said hollow body and having said hot wire element mounted therein; said circumferential projection having a bore extending therethrough in the direction of the primary flow path, a circumferential groove in the downstream surface thereof and communicating with said bore, and a cover plate secured over said downstream surface to form said groove into a channel having an opening into said primary flow path and serving as an outlet for said auxiliary flow path.

* * * * *